(12) United States Patent
Bouchard et al.

(10) Patent No.: US 9,058,303 B2
(45) Date of Patent: Jun. 16, 2015

(54) CONVEX COLLECTIVE MATRIX FACTORIZATION

(71) Applicant: Xerox Corporation, Norwalk, CT (US)

(72) Inventors: Guillaume Bouchard, Crolles (FR); Dawei Yin, Bethlehem, PA (US); Shengbo Guo, Saint-Martin-d'Heres (FR)

(73) Assignee: XEROX CORPORATION, Norwalk, CT (US)

( * ) Notice: Subject to any disclaimer, the term of this patent is extended or adjusted under 35 U.S.C. 154(b) by 400 days.

(21) Appl. No.: 13/689,955

(22) Filed: Nov. 30, 2012

(65) Prior Publication Data

US 2014/0156579 A1    Jun. 5, 2014

(51) Int. Cl.
*G06F 17/16* (2006.01)
*G06N 5/04* (2006.01)
*G06F 17/30* (2006.01)

(52) U.S. Cl.
CPC ........... *G06F 17/16* (2013.01); *G06N 5/043* (2013.01); *G06F 17/30867* (2013.01)

(58) Field of Classification Search
CPC .... G06F 17/16; G06F 17/30867; G06N 5/043
See application file for complete search history.

(56) References Cited

U.S. PATENT DOCUMENTS

| 8,775,335 | B2* | 7/2014 | Lin et al. | 706/12 |
|---|---|---|---|---|
| 2009/0119261 | A1* | 5/2009 | Ismalon | 707/3 |
| 2009/0265404 | A1* | 10/2009 | Tzeng | 708/208 |
| 2009/0271433 | A1* | 10/2009 | Perronnin et al. | 707/103 R |
| 2009/0299996 | A1* | 12/2009 | Yu et al. | 707/5 |
| 2010/0235220 | A1* | 9/2010 | Guha et al. | 705/10 |
| 2010/0268661 | A1* | 10/2010 | Levy et al. | 705/347 |
| 2013/0111526 | A1* | 5/2013 | Glowaty et al. | 725/53 |

OTHER PUBLICATIONS

Agarwal, et al., "Regression-based latent factor models," SIGKDD, pp. 19-28 (2009).
Agarwal, et al., "Localized factor models for multi-context recommendation," SIGKDD, pp. 609-617 (Aug. 2011).
Krohn-Grimberghe, et al., "Multi-relational matrix factorization using bayesian personalized ranking for social network data." Proceedings of the fifth ACM international conference on Web search and data mining. ACM, pp. 173-182 (Feb. 2012).

(Continued)

*Primary Examiner* — Jeffrey A Gaffin
*Assistant Examiner* — Thomas Fink
(74) *Attorney, Agent, or Firm* — Fay Sharpe LLP (57) ABSTRACT

A method operates on observed relationship data between pairs of entities of a set of entities including entities of at least two (and optionally at least three) different entity types. An observed collective symmetric matrix is constructed in which element (n,m)=element (m,n) stores the observed relationship between entities indexed n and m when the observed relationship data includes this observed relationship. A prediction collective symmetric matrix is optimized in order to minimize a loss function comparing the observed collective symmetric matrix and the prediction collective symmetric matrix. A relationship between two entities of the set of entities is predicted using the optimized prediction collective symmetric matrix. Entities of the same entity type may be indexed using a contiguous set of indices such that the entity type maps to a contiguous set of rows and corresponding contiguous set of columns in the observed collective symmetric matrix.

26 Claims, 10 Drawing Sheets

(56) References Cited

OTHER PUBLICATIONS

Bach, et al., "Convex Sparse Matrix Factorizations," Laboratoire d'Informatique de l'Ecole Normale Supérieure, Paris, France, pp. 1-12 (Dec. 10, 2008).
Bennett, et al., "The Netflix prize," Proceedings of KDD Cup and Workshop, pp. 3-6 (Aug. 12, 2007).
Bottou, et al., "The Tradeoffs of Large Scale Learning," Optimization for Machine Learning, MIT Press, pp. 351-368 (2011).
Burer, et al., "Local Minima and Convergence in Low-Rank Semi-definite Programming," Digital Object Identifier, pp. 427-444 (Sep. 30, 2003).
Cohn, et al., "The missing link—a probabilistic model of document content and hypertext connectivity," In *Proceedings of the 2000 Conference on Advances in Neural Information Processing Systems. The MIT Press*, pp. 430-436. (2001).
Hofmann, et al. "Latent class models for collaborative filtering," in *IJCAI*, pp. 688-693 (Jul. 1999).
Jaggi, et al. "A Simple Algorithm for Nuclear Norm Regularized Problems," Proceedings of the $27^{th}$ International Conference on Machine Learning, pp. 471-478 (2010).
Khan, et al., "Variational Bounds for Mixed-Data Factor Analysis," NIPS, pp. 1108-1116 (2010).
Koren, et al., "Matrix factorization techniques for recommender systems," *Computer* 42.8 pp. 42-49 (Aug. 2009).
Lee, et al., "Learning the parts of objects by nonnegative matrix factorization," Nature 401, pp. 788-791 (Oct. 1999).
Lee, et al. "Practical Large-Scale Optimization for Max-Norm Regularization," Advances in Neural Information Processing Systems, pp. 1297-1305 (2010).
Lippert, et al., "Relation Prediction in Multi-Relational Domains using Matrix Factorization," NIPS 2008 Workshop on Structured Input Structure Output, pp. 1-4 (Dec. 2008).
Long, et al., "Spectral Clustering for Multi-type Relational Data," Proceedings of the $23^{rd}$ International Conference on Machine Learning, pp. 585-592 (Jun. 2006).
Recht, et al., "Guaranteed Minimum-Rank Solution of Linear Matrix Equations via Nuclear Norm Minimization," SIAM Review, 52, pp. 471-501 (Jun. 28, 2007).
Salakhutdinov, et al., "Probabilistic matrix factorization," NIPS 21, pp. 1257-1264 (2008).
Salakhutdinov, et al., "Collaborative Filtering in a Non-Uniform World: Learning with the Weighted Trace Norm," NIPS 23, pp. 2056-2064 (2010).
Shan, et al., "Generalized Probabilistic Matrix Factorizations for Collaborative Filtering," in *Data Mining (ICDM), IEEE 10th International Conference* on (pp. 1025-1030). (Dec. 2010).
Singh, et al., "A Bayesian Matrix Factorization Model for Relational Data," UAI, pp. 556-563 (2010).
Singh, et al., "Relational Learning via Collective Matrix Factorization," in SIGKDD, pp. 650-658 (Aug. 2008).
Srebro, et al., "Rank, Trace-Norm and Max-Norm," In *Learning Theory*, pp. 545-560 (2005).
Srebro, et al., "Maximum Margin Matrix Factorization," NIPS 17, pp. 1329-1336 (2005).
Takacs, et al., "ON the Gravity Recommendation System," In *Proceedings of KDD cup and workshop* (vol. 2007), pp. 1-46 (Aug. 2007).
Yilmaz, et al., "Generalised Coupled Tensor Factorisation," In Advances in Neural Information Processing Systems, pp. 2151-2159 (2011).
Zhang, et al., "Multi-Domain Collaborative Filtering," UAI, pp. 725-732 (2010).
Zhu et al., "Combining Content and Link for Classification using Matrix Factorization," Proceedings of the 30th annual international ACM SIGIR conference on Research and development in information retrieval, pp. 487-494 (Jul. 2007).

\* cited by examiner

|  | E1: {F_users} | E2: {users} | E3: {items} | E4: {F_item} |
|---|---|---|---|---|
| E1: {F_user} |  | $x_1$ |  |  |
| E2: {users} | $x_1^T$ |  | $x_2$ |  |
| E3: {items} |  | $x_2^T$ |  | $x_3$ |
| E4: {F_item} |  |  | $x_3^T$ |  |

CONVEX COLLECTIVE MATRIX FACTORIZATION

BACKGROUND

The following relates to the online retail arts, online service provider arts, recommender system arts, collaborative filtering arts, and related arts.

Recommender systems find diverse applications in the retail, service, and other industries. A recommender system attempts to predict the preferences or choices of a user, and can be used, by way of illustrative example, to provide recommendations to a user from amongst a catalog of items or services. For example, an online retailer provides a website via which a user (i.e., customer) browses the retailer's catalog of products or services. The retailer desires for the customer to purchase products or services. Toward that end, it is useful for the retailer to be able to automatically identify and present to the customer specific products or services that the customer is likely to want to purchase. The recommender system, in this application, identifies products or services that are likely to be of interest to the customer, and these products are recommended to the customer.

Collaborative filtering is a recommender approach that makes predictions for a given user based on collected information about preferences of many other users. For example, in a retail setting, collaborative filtering may make use of a database of product ratings provided for various products or services by users of the retailer's product catalog. By comparing a given user's rating history with other users via collaborative filtering, predictions can be made as to the rating that the user would likely assign to a product or service the user has not yet rated. The user can then be presented with products or services having a high predicted rating but which the user has not yet purchased and/or rated. Collaborative filtering can also provide "denoising", in that it can compensate for noise in the ratings data caused by factors such as some users intentionally giving inaccurate ratings.

Collaborative filtering can accommodate noise and also sparseness in the available data. In the retail ratings database context, sparseness results because any given user typically has not rated most products in the catalog. However, in some situations noise and/or sparseness may make predictions unreliable. For example, predictions will be difficult for a new user who has no rating history, or for a new product that has not yet received a significant number of ratings.

One way to further accommodate noise and/or sparseness is collective collaborative filtering. In conventional collaborative filtering a single relationship is analyzed, such as a user-rating relationship in the case of a retail catalog recommender system. Multiple relationships can be processed by performing collaborative filtering independently for each relationship. Collective collaborative filtering, on the other hand, attempts to leverage information across relationships. For example, the user-ratings relationship may not be useful by itself in providing recommendations for a new product. But, if additional product-product feature data are available (where "product features" may include any information about the product, e.g. product manufacturer, product price range, intended use information, et cetera), then this additional information can in principle be leveraged to generate recommendations for the new product, even if the new product has few (or even no) ratings.

In collective collaborative filtering (also called multi-view learning), each relationship is represented by a matrix (e.g., a user-ratings matrix and a product-product features matrix, in the foregoing example). These matrices are factored simultaneously, with any parameter of any entity that is shared between two or more relations being linked and optimized as a single parameter (i.e., co-factorization). See, e.g. Singh et al., "Relational learning via collective matrix factorization", in SIGKDD, pages 650-658 (2008); Singh et al., "A Bayesian matrix factorization model for relational data", in UAI, pages 556-563 (2010); Zhang et al., "Multi-domain collaborative filtering", in UAI, pages 725-732 (2010); Lippert et al., "Relation prediction in multi-relational domains using matrix factorization", in NIPS Workshop on SISO (2008).

These approaches advantageously leverage shared information between the collaborative filtering operations. However, they suffer deficiencies such as high computational complexity and non-convexity (potentially leading to converging to a local minimum).

BRIEF DESCRIPTION

In some illustrative embodiments disclosed as illustrative examples herein, a non-transitory storage medium stores instructions executable by an electronic data processing device to perform a method including: constructing an observed collective symmetric matrix Y storing observed relationship data between pairs of entities for E entities of K different entity types where K is greater than or equal to two (and in some embodiments K is greater than or equal to three) with $n_k$ entities belonging to entity type k for k=1, ..., K and $E=n_1+ \ldots +n_K$, the observed collective symmetric matrix Y being a symmetric matrix with E rows for the E entities and E columns for the E entities; optimizing a prediction collective symmetric matrix X that is also a symmetric matrix with E rows for the E entities and E columns for the E entities in order to minimize a loss function comparing the observed collective symmetric matrix Y with the prediction collective symmetric matrix X, the optimizing generating an optimized prediction collective symmetric matrix $X_{opt}$; and performing a prediction operation for a first entity of the E entities given a second entity of the E entities based on an element of the optimized prediction collective symmetric matrix $X_{opt}$ corresponding to the first and second entities. In some embodiments, the constructing operation comprises constructing the observed collective symmetric matrix Y with, for each entity type k=1, ..., K, the $n_k$ rows grouped as contiguous rows and the $n_k$ columns grouped as contiguous columns. In some embodiments the optimizing operation comprises optimizing the prediction collective symmetric matrix X in order to minimize a convex loss function comparing the observed collective symmetric matrix Y with the prediction collective symmetric matrix X. In some such embodiments the convex loss function is $l(X,Y)+\lambda\|X\|_*$ where $l(X,Y)$ is a loss function comparing the prediction collective symmetric matrix X and the observed collective symmetric matrix Y, $\|X\|_*$ is the trace norm of the prediction collective symmetric matrix X, and $\lambda$ is a scalar value.

In some illustrative embodiments disclosed as illustrative examples herein, an apparatus comprises a non-transitory storage medium as set forth in the immediately preceding paragraph and an electronic data processing device configured to read and execute instructions stored on the non-transitory storage medium.

In some illustrative embodiments disclosed as illustrative examples herein, a method is operative on observed relationship data between pairs of entities of a set of entities, the set of entities including entities of at least two different entity types (and in some embodiments at least three different entity types), the method comprising: constructing an observed collective symmetric matrix in which element (n,m) equals element (m,n) and stores the observed relationship between entities of the set of entities indexed n and m conditional upon the observed relationship data including an observed relationship between the entities indexed n and m; optimizing a prediction collective symmetric matrix in order to minimize a loss function comparing the observed collective symmetric matrix and the prediction collective symmetric matrix, the optimizing generating an optimized prediction collective symmetric matrix; and predicting a relationship between two entities of the set of entities using the optimized prediction collective symmetric matrix. The constructing, the optimizing, and the predicting are suitably performed by an electronic data processing device.

In some illustrative embodiments disclosed as illustrative examples herein, an apparatus is operative on observed relationship data between pairs of entities of a set of entities, the set of entities including entities of at least two different entity types, the apparatus comprising: constructing an observed collective symmetric matrix Y in which element (n,m) equals element (m,n) and stores the observed relationship between entities of the set of entities indexed n and m conditional upon the observed relationship data including an observed relationship between the entities indexed n and m; and optimizing a prediction collective symmetric matrix X in order to minimize a convex loss function $l(X,Y)+\lambda\|X\|_*$ where $l(X,Y)$ is a function comparing the prediction collective symmetric matrix X and the observed collective symmetric matrix Y, $\lambda\|X\|_*$ is the trace norm of the prediction collective symmetric matrix X, and $\lambda$ is a scalar value.

DETAILED DESCRIPTION

Figure 1:
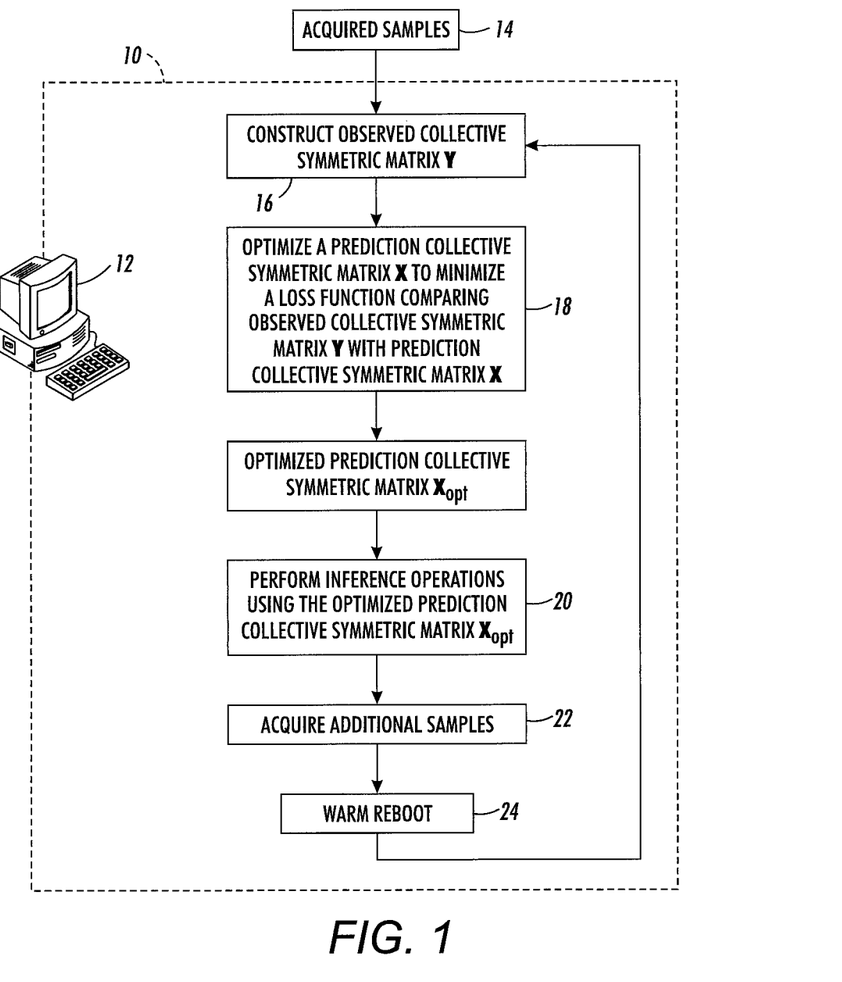
FIG. 1 diagrammatically shows an illustrative inference system.

With reference to FIG. 1, an inference system 10 is implemented by a computer or other electronic data processing device 12 that includes a processor (e.g., microprocessor, optionally multi-core) and data storage and that executes instructions to perform operations including: in an operation 16, constructing an observed collective symmetric matrix Y storing observed relationship data between pairs of entities for E entities of K different entity types where K is greater than or equal to two with $n_k$ entities belonging to entity type k for k=1, K and $E=n_1+\ldots+n_K$, the observed collective symmetric matrix Y being a symmetric matrix with E rows for the E entities and E columns for the E entities; in an operation 18, optimizing a prediction collective symmetric matrix X that is also a symmetric matrix with E rows for the E entities and E columns for the E entities in order to minimize a loss function comparing the observed collective symmetric matrix Y with the prediction collective symmetric matrix X, the optimizing generating an optimized prediction collective symmetric matrix $X_{opt}$; performing inference operations 20 using the optimized prediction collective symmetric matrix $X_{opt}$; and optionally performing occasional inference system updates by collecting additional samples in an operation 22 and performing a reboot 24 entailing repeating the operations 16, 18 to update the optimized prediction collective symmetric matrix $X_{opt}$. The instructions that are executed by the computer or other electronic data processing device 12 to perform the operations 16, 18, 20, 22, 24 (or a sub-set of these instructions, e.g. optionally without performing the update operations 22, 24) are suitably stored on a non-transitory storage medium (not shown) such as a hard disk or other magnetic storage medium, random access memory (RAM), read-only memory (ROM), or another electronic storage medium, an optical disk or other optical storage medium, a combination of the foregoing, or so forth.

The disclosed collective collaborative filtering (i.e. multi-view learning) approaches employ observed and prediction collective symmetric matrices Y and X. These matrices provide an elegant and simple framework for performing collective collaborative filtering, and enable existing matrix factorization approaches for (non-collective) collaborative filtering to be extended in a straightforward way to the collective collaborative filtering case. In existing collective collaborative filtering techniques, each relationship is represented by a matrix (e.g., a user-ratings matrix, a product-product features matrix, and so forth), and these matrices are factored simultaneously with shared parameters linked and optimized as a single parameter (i.e., co-factorization). The collective symmetric matrix disclosed herein is a symmetric matrix that combines these relationship matrices into a single symmetric matrix. A symmetric matrix is a square matrix in which the value for any element (n,m) equals the value for the element (m,n). Because of this symmetry across the matrix diagonal, it is to be understood that, for example, the operation 18 which constructs the observed collective symmetric matrix Y may construct only the half of the collective symmetric matrix Y that is above (and including) the matrix diagonal; or, alternatively, may construct only the half of the collective symmetric matrix Y that is below (and including) the matrix diagonal.

The collective symmetric matrix is constructed as follows. Consider observed relationship data between pairs of entities for a set of E entities of K different entity types where K is greater than or equal to two. The observed relationship data is assumed to include two or more different relationship types, e.g. if there are two entity types $e_1$ and $e_2$ then the possible relationship types are $e_1$-$e_1$ relationships, $e_1$-$e_2$ relationships, and $e_2$-$e_2$ relationships. The observed data may not include all relationship types: for example, if $e_1$ are users and $e_2$ are images (for example, in a photography-based social media website), then the relationship data may include user-user relationships ($e_1$-$e_1$ relationships) and user-image relationships ($e_1$-$e_2$ relationships) but perhaps not image-image relationships. The set of E entities includes $n_k$ entities belonging to entity type k for k=1, ..., K, and $E=n_1+\ldots+n_K$. For this relationship data, the collective symmetric matrix is an E×E square matrix with E rows for the E entities and E columns for the E entities. Thus, the collective symmetric matrix has an element for every possible pairwise relationship.

Figure 2:
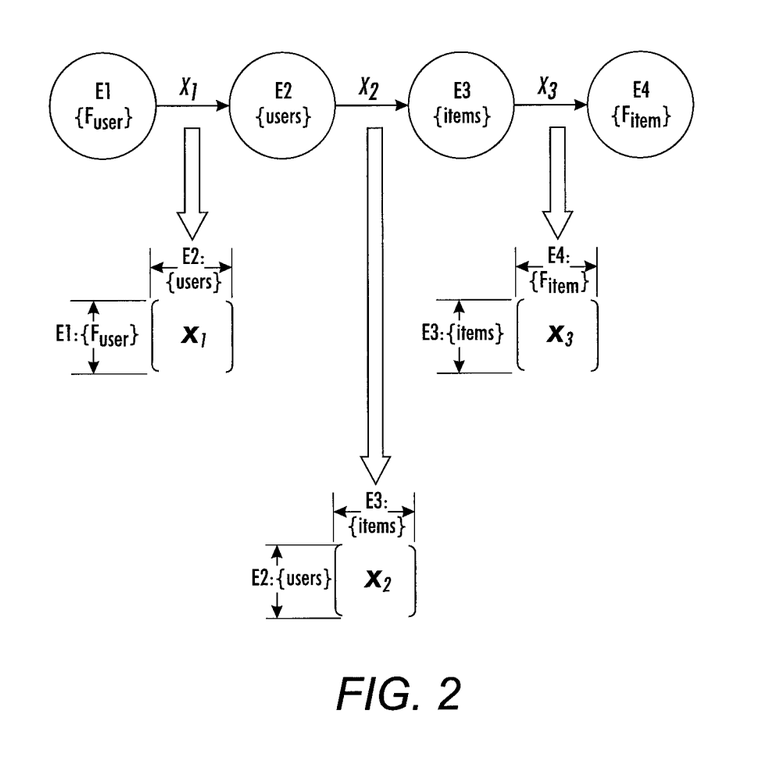
FIGS. 2 and 3 diagrammatically show construction of a collective symmetric matrix for an illustrative case of three relationships amongst four different entity types.
Figure 3:
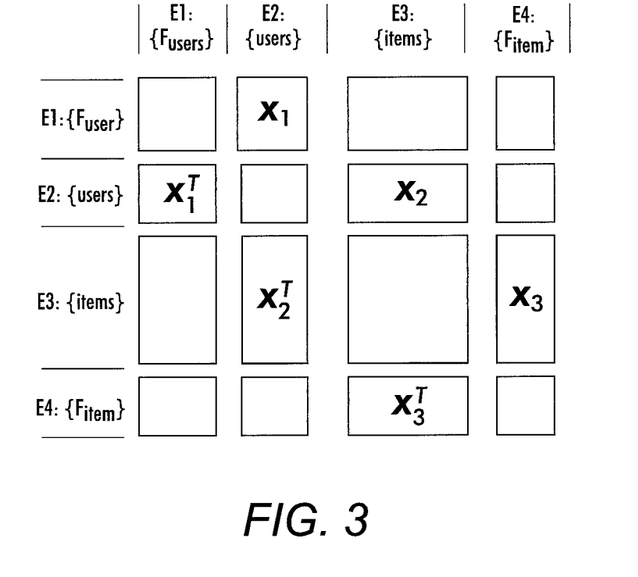

With reference to FIGS. 2 and 3, the relationship between the conventional relationship matrixes and the collective symmetric matrix disclosed herein is illustrated. As shown in FIG. 2, the set of entities includes four entity types: $E_1$ which is user features (e.g., age, gender, et cetera); $E_2$ which is users (for example, customers of an online store), $E_3$ which is items (e.g. products available for sale at the online store), and $E_4$ is item features (e.g., manufacturer, product classification, et cetera). As further diagrammatically indicated in FIG. 2, there are three observed relationship types: $X_1=E_1-E_2$ (information about the users); $X_2=E_2-E_3$ (product ratings provided by the users); and $X_3=E_3-E_4$ (information about the products).

FIG. 2 shows the three relationship matrices $X_1$, $X_2$, and $X_3$, which are co-factored to perform collective collaborative filtering (i.e., multi-view learning) in existing approaches. Since the number of users, the number of products, the number of user features, and the number of item features, are all in general different, the three relationship matrices $X_1$, $X_2$, and $X_3$ are not (in general) square and are not (in general) of the same (or even similar) dimensionality. For example, a typical online store may record only a few user features (e.g., $|E_1|=5$ as a typical example) since users are generally not willing to provide detailed information about themselves to an online retailer. The store may store somewhat more information about the products (e.g., $|E_4|=10$ as a typical example). On the other hand, the number of customers and the number of products available for sale is typically much larger (e.g., $|E_2|=25,000$ and $|E_3|=8,000$ as typical examples). In this illustrative example, $X_1$ has dimensions 5×25000, $X_2$ has dimensions 25000×8000, and $X_3$ has dimensions 8000×10. The widely different dimensionalities of these three illustrative relationship matrices makes the co-factorization computationally challenging.

With reference to FIG. 3, in contrast, the collective symmetric matrix is a symmetric matrix of square dimensions 33015×33015. The matrix is highly sparse—it includes regions corresponding to the relationship matrices $X_1$, $X_2$, and $X_3$ and to their transposes, with the remaining regions being filled with zeroes. Note that the relationship matrices themselves are often sparse—in the present example, the user-item ratings matrix $X_2$ contains nonzero values only for those elements corresponding to user ratings provided by users, so that this matrix is expected to be itself sparse.

Figure 4:
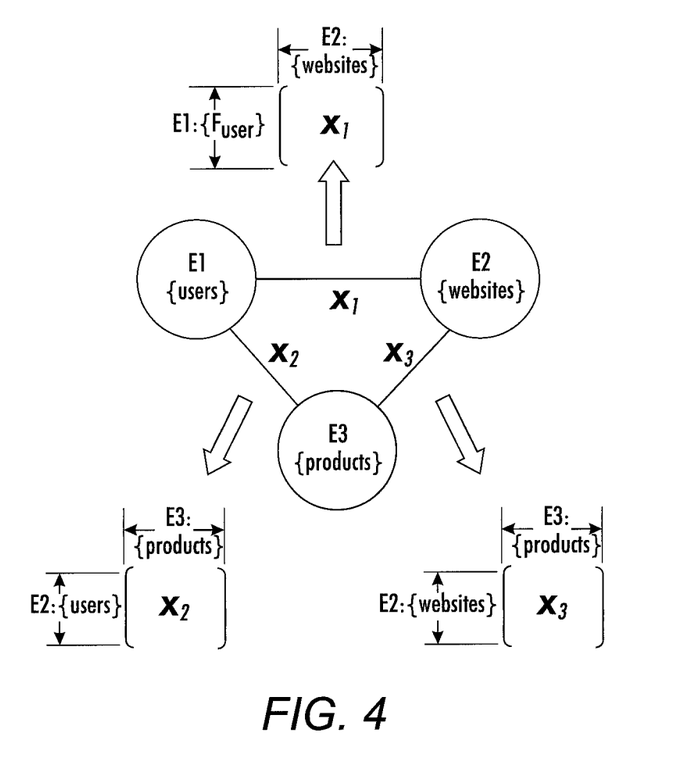
FIGS. 4 and 5 diagrammatically show construction of a collective symmetric matrix for an illustrative case of three relationships amongst three different entity types.
Figure 5:
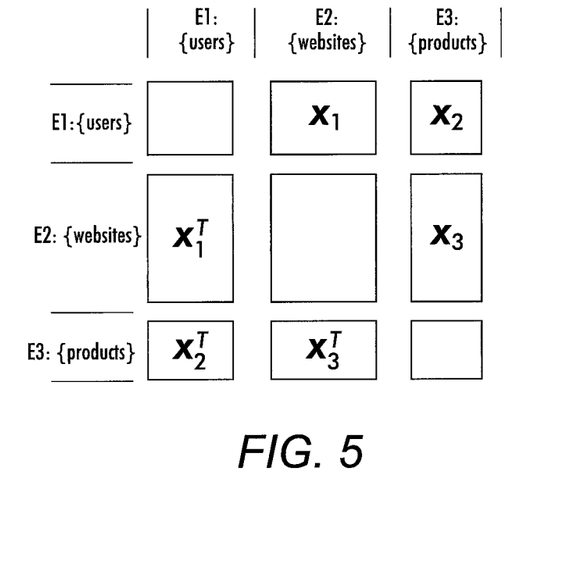

With reference to FIGS. 4 and 5, another illustrative example is provided. This example demonstrates that more general cases with three or more relations are not straightforward. This example has a "loopy" relationship structure as shown in FIG. 4, which involves three entity types $E_1$ (users), $E_2$ (websites), and $E_3$ (products), and three relations in a loop: $E_1$-$E_2$, $E_2$-$E_3$ and $E_3$-$E_1$ encoded in matrices $X_1$, $X_2$, and $X_3$, respectively. The collective symmetric matrix (FIG. 5) naturally handles such loopy structures.

In the illustrative examples of FIGS. 2-5, the observed collective symmetric matrix is constructed with, for each entity type $k=1, \ldots, K$, the $n_k$ rows grouped as contiguous rows and the $n_k$ columns grouped as contiguous columns. For example, in the collective symmetric matrix of FIG. 5, the first $n_1$ rows and the first $n_1$ columns correspond to the users; the next $n_2$ rows and next $n_2$ columns correspond to websites; and the last $n_3$ rows and last $n_3$ columns correspond to products. This grouping is typically convenient as it results in the various relationship matrices being sub-matrices of the collective symmetric matrix; however, it is alternatively contemplated to (by way of illustrative example) interweave rows for users, rows for websites, and rows for products. Such interweaving may have computational advantages by providing a more uniform distribution of the observations over the elements of the collective symmetric matrix.

A disclosed herein, a semi-definite program (SDP) formulation of the matrix trace norm can be directly extended to define a norm on the collective symmetric matrices defined herein. This norm, referred to herein as the collective trace norm, is a strict generalization of the trace norm in the sense that they are both equivalent when there is a single relation. The fact that the collective trace norm is directly related to the standard (matrix) trace norm enables the collective collaborative filtering (i.e. multi-task learning) to leverage various useful properties of the matrix trace norm, such as its low-rank inducing properties, the ability to derive an efficient Singular Value Thresholding algorithm and its formulation as a decomposition norm and the weighted version of the norm. The low-rank inducing properties of the trace-norm allow the solution of regularized pointwise estimates to have fewer dimensions than the rank of the observation matrix. The decomposition norm formulation enables the regularized estimator to be expressed as an unconstrained optimization problem that can be solved using standard gradient descent algorithms, and in particular the Stochastic Gradient Descent (SGD) for large scale problems.

The trace norm $\lambda\|X\|_*$ of a rectangular matrix $X \in \mathbb{R}^{n_1 \times n_2}$ is defined as the sum of the absolute values of its singular values. An alternative definition can be obtained as a decomposition norm, that is, as a formulation that decomposes X into a product of two matrices:

$$\|X\|_* = \min_{UV^T=X} \|U\|_F^2 + \|V\|_F^2 \qquad (1)$$

where $U \in \mathbb{R}^{n_1 \times \min(n_1,n_2)}$, $V \in \mathbb{R}^{n_2 \times \min(n_1,n_2)}$, $M^T$ denotes the transpose of matrix M, and $\|\bullet\|_F^2$ is the Frobenius norm. The trace norm can be equivalently defined as the value of a semi-definite program (SDP) as:

$$\|X\|_* = \frac{1}{2} \min_{X_1, X_2} (\text{trace}(X_1) + \text{trace}(X_2)) \text{ s.t. } \begin{bmatrix} X_1 & X \\ X^T & X_2 \end{bmatrix} \in S_{n_1+n_2}^+ \qquad (2)$$

where $S_N^+$ denotes the (convex) set of symmetric positive definite matrices of size (N×N) and $N=n_1+n_2$. An advantage of the representations of Equations (1) and (2) is that they remain valid norms on the space of partially observed matrices X. In other words, a definition based on eigenvalues assumes that X belongs to the space of fully observed matrices $X=\mathbb{R}^{n_1 \times n_2}$, whereas Equations (1) and (2) can be used to define a norm on any linear subspace of X.

The trace norm of Equations (1) and (2) is extended herein to derive a convex collective factorization framework for collective collaborative filtering (i.e. multi-task learning) where there are two or more binary relations amongst some (arbitrary) number of entities. The binary relations can be represented by matrices, as shown for illustrative examples in FIGS. 2 and 4. Suppose there are K entity types represented by $E=\{E_1, \ldots, E_K\}$. The number of entities for the $k^{th}$ type of entity (i.e., for entity $E_k$) is denoted $n_k$. It is also assumed that V binary relations (or views) are observed, where each view or relation $v \in \{1, \ldots, V\}$ is a pair $(r_v, c_v) \in E^2$, $r_v$ being the row entity type and $c_v$ the column entity type. As further notation, $X=\{X_1, \ldots, X_V\}$ is a set of V matrices defined over the product space (also known as n-ary Cartesian product)

$$\chi = \mathfrak{R}^{n_{r_1} \times n_{c_1}} \otimes$$

$$\mathfrak{R}^{n_{r_V} \times n_{c_V}}.$$

The set of unique rows associated to a given entity type k is denoted by $i_k=(\bar{n}_{k-1}+1, \bar{n}_k)$. Given a large matrix A, the notation $A(i_k, i_{k'})$ represents the $\mathfrak{R}^{|i_k| \times |i_{k'}|}$ matrix composed by the rows of A with indices $i_k$ and columns with indices $i_{k'}$. In addition, the notation $A(i_k,:)$ identifies the matrix composed by the rows of A with indices $i_k$. The function $B: X \to S_n$ creates a symmetric block-matrix from a set of views: if $S=B(X)$ for a view $X=(X_1, \ldots, X_V)$, then it follows that $S(i_{r_v}, i_{c_v})=X_v$.

It is desired to define a norm on X. Let $$\bar{n}_k = \sum_{i=1}^{k-1} n_i$$

be the cumulative sum of the entities and let $N=\Sigma_{k=1}^K n_k$ be the total number of entities. The co-factorization trace norm of a multirelational dataset $X \in \mathcal{X}$ is defined as:

$$\|X\|_* = \frac{1}{2} \min_{\substack{Z \in S_{N'}^+ \\ \{A_v Z = X_v\}_{v=1}^V}} \text{trace}(Z) \quad (3)$$

where $A_v$ is the linear operator that selects the $n_{r_v} \times n_{c_v}$ block of Z, starting at row $\bar{n}_{r_v}+1$ and column $\bar{n}_{c_v}+1$, that is, $$[\mathcal{A}_v Z]_{ij} = Z_{(i+\bar{n}_{r_v})(j+\bar{n}_{c_v})}$$

for $(i,j) \in \{1, \ldots, n_{r_v}\} \times \{1, \ldots, n_{c_v}\}$ as shown in FIGS. 3 and 5 for the illustrative examples. It can be shown that $\|X\|_*$ is indeed a norm on X and satisfies positive homogeneity, separation, and triangular inequality properties. Furthermore, the norm $\|X\|_*$ admits a representation as a decomposition norm:

$$\|X\|_* = \frac{1}{2} \min_{\{U^{r_v}(U^{c_v})^T = X_v\}_{v=1}^V} \left( \sum_{k=1}^K \|U^k\|_F^2 \right) \quad (4)$$

where $U^k$ are latent matrices with $n_k$ rows and $r^* = \min_l\{\bar{n}_l\}$ columns.

This is a direct generalization of Equation (1) to the collective factorization case. This characterization has strong similarities with the classical low-rank formulation of collective factorization: each view is constrained to have a factored representation and the factors of a given type are shared across all the views involving this type. This connection can be used to derive an unconstrained gradient descent algorithm. Note also that the factors $U^k$ are not constrained a priori to be low-rank. The maximum rank $r^*=\min_l\{\bar{n}_l\}$ is a direct generalization of the maximum rank of rectangular matrices $\min\{n_1, n_2\}$. It can also be shown that the co-factorization trace norm is an atomic norm where the set of atoms M is the set of all possible rank-1 collective factorizations of the data, where a rank-1 collective factorization is a set of rank-1 matrices of unit norm: $M=\{(u^{r_v}u^{c_v T})_{v=1}^V, \|u^k\|=1, u^k \in \mathfrak{R}^{n_k}, k=1, \ldots, K\}$. Since the atoms are rank-1 decompositions, the norm is low-rank inducing, i.e. solutions of estimation problems regularized by this norm will tend to have low rank, similarly to the trace-norm.

FIGS. 2-5 show two examples of collective factorization of three relations. In FIGS. 2-3, the relations are sequential, i.e. entities of type $E_1$ are in relation with entities of type $E_2$ which in turn are in relation with entities of type $E_3$ which is finally are in relation with entities of type $E_4$. This dataset may occur, for example, in the context of a movie recommender system where one may be presented with four entities: users, items, user features, and item features, denoted by $E_1, \ldots, E_4$ respectively; and three relations: user-user feature relation $R_1$, user-movie rating relation $R_2$, and movie-movie feature $R_3$, and the problem is to infer the missing elements in the user-item rating matrix. It is noteworthy that in general one may have missing user features and/or movie features (e.g. a user did not specified his personal information), and thus the problem is not only to predict ratings but also missing values in any relations. FIGS. 4-5 illustrate a circular relationship involving three entity types with three relations. An example of such setting could be the interactions between users, websites and products: users access to websites, websites display product advertisements, and products are bought by users. In the illustrative circular relationship of FIG. 5, the top-right symmetric matrix cannot be easily cast in the SDP formulation of the trace norm in Equation (2).

Of interest is the minimization of a convex loss function $O_\lambda(X)$ regularized by the co-factorization trace norm, i.e.:

$$\min_{X \in \mathcal{X}} O_\lambda(X), \ O_\lambda(X) = \ell(X) + \lambda \|X\|_* \quad (5)$$

The loss is typically the likelihood of noisy observations. In this illustrative example, the matrix completion problem is addressed. Let $P_\Omega: \mathcal{X} \to \mathcal{X}$ be the projection onto the set of matrices equal to zeros outside the observed values defined by the set $\Omega$, so that the (i,j)-th component of the view v in $P_\Omega(X)$ is equal to the element at the i-th row and j-th column in $X_v$ if (v,i,j) is in $\Omega$ and zero otherwise. Using the square loss, the problem corresponds to the minimization of:

$$\|P_\Omega(X) - P_\Omega(Y)\|_F^2 + \lambda \|X\|_* \quad (6)$$

where $Y \in \mathcal{X}$ is the set of observed matrices. Depending on the formulation, the strength of regularization $\lambda > 0$ can be optimized on a held-out data removed from the initial set of observations $\Omega$.

The regularized loss function of Equation (6) can be solved using various techniques. In the following, a Singular Value Thresholding approach is described. For the standard matrix trace-norm, the solution to least-square problems regularized by the trace norm can be found in terms of Singular Value Decomposition (SVD) with a shrinkage of the eigenvalues. If the data matrix is fully observed, a single SVD is needed; otherwise a first order algorithm called Proximal Forward-Backward Splitting (PFBS) can be derived, alternating between a SVD computation and the imputation of missing values. In the following, it is shown that PFBS can be extended to the co-factorization framework employing collective symmetric matrices as disclosed herein. The generalization is obtained by using the connection between the SVD solution and its corresponding SDP formulation which leads to a eigenvalue decomposition of the symmetric block-matrix B (Y) discussed previously herein. First, a co-factorization thresholding operator $S_\lambda(X)$ is defined. The co-factorization thresholding operator $S_\lambda(X)$ applied to a set of matrices $X=(X_1, \ldots, X_v)$ is defined as:

$$S_\lambda(X):=(U^{r_1}DU^{c_1 T}, \ldots, U^{r_V}DU^{c_V T}), D=\text{diag}(\max(\sigma - \lambda, 0))) \quad (7)$$

where $UDU^T = B(X)$ is the eigen-decomposition of the symmetric block matrix $B(X)$ and $U^k = U(i_k,:)$. It can be shown that $S_\lambda(X)$ is the proximity operator of $\lambda \|X\|_*$ as follows. If X is the space of complete relations, i.e. for every pair of types (k, k') $\in \{1, \ldots, K\}^2$, there exists a view $v \in \{1, \ldots, V\}$ such that $r_v=k$ and $c_v=k'$ or $r_v=k'$ and $c_v=k$, then for every $\lambda \geq 0$ and every $Y \in X$, the co-factorization thresholding operator of Equation (7) satisfies:

$$S_\lambda(Y) = \arg\min_X \left\{ \frac{1}{2} \sum_{v=1}^V \|X^v - Y^v\|_F^2 + \lambda \|X\|_* \right\} \quad (8)$$

It can be seen that the problem of Equation (3) can be directly found using this operator for square loss and fully observed relations. However, the assumption of observing the value of the relation between every pair of type is unrealistic in general inference problems. The solution of Equation (6) is characterized by the fixed point equation $X=S_{\lambda\gamma}(X+\gamma P_\Omega(Y-X))$ for every $\gamma>0$. Algorithm 1 set forth below implements this procedure.

---

Algorithm 1 Singular Value Thresholding for Co-Factorization
(Partial observations)

---

INPUT: Observed relations $\Omega$, corresponding values Y, regularization $\lambda$
OUTPUT: $X^{(T)}$
  1: INITIALIZE $Z^{(0)} = (0, \ldots, 0)$ to the zero matrix set in $\chi$
  2: for $t = 1, 2, \ldots, T$ do
  3:     $X^{(t)} = S_{\lambda\gamma_t}(Z^{(t-1)})$
  4:     $Z^{(t)} = X^{(t)} + \gamma_t P_\Omega(Y - X^{(t)})$
  5: end for

---

It can be shown that, for any sequence $(\gamma_t)_{t\in\mathbb{N}}$ such that $0 < \inf_{n\in\mathbb{N}}$ and $\sup_{n\in\mathbb{N}} <$ $$\frac{2}{\lambda},$$

the output $X^{(T)}$ of Algorithm 1 converges to the solution of Equation (3). Since $S_\lambda$ is a proximity operator, this result is a direct application of the PFBS convergence.

In an alternative approach, the decomposition norm of Equation (4) can be used to express the problem as an unconstrained minimization. Plugging the value of Equation (4) into Equation (3) leads to:

$$U = \arg\min_{U^1,\ldots,U^V} \left\{ \sum_{(v,i,j)\in\Omega} \ell\left((U_i^{r_v})^T U_j^{c_v}, Y_{ij}^v\right) + \lambda \sum_{k=1}^K \|U_k\|_F^2 \right\} \quad (9)$$

where $U_j^k \in \mathfrak{R}^{r*}$ is the feature representation of the i-th entity of entity type k (i.e., the i-th row) and $\Omega$ is the set of observation triplets (v,i,j) representing the view v, the index row i and the index column j. Note that if the number of columns of the matrix U is restricted to a fixed number $r \leq r^*$, this objective function matches exactly the objective function of the collective matrix factorization model given in Singh et al., "Relational learning via collective matrix factorization", in *SIGKDD*, pages 650-658 (2008). Hence, by using the fact that the trace-norm is low-rank promoting, the algorithm for collective factorization can be used to solve the present problem provided the selected rank r is larger than rank ($\hat{U}$), the rank of the optimal solution. Although non-convex, it can be shown that local minima which are rank-deficient can be shown to be global minima.

Empirical evaluations of the disclosed convex collective factorization were performed on two real data sets: Movie-Lens (available at http://www.grouplens.org/node/73, last accessed Aug. 28, 2012) and Flickr® (available at http://www.flickr.com/, last accessed Aug. 28, 2012). Flickr® is a social bookmarking site where users can tag and comment upon photos.

The MovieLens data set data set included one million ratings involving 6,000 users on 4,000 movies. Ratings in the MovieLens dataset are integers ranging from 1 to 5, and each rating is associated with a timestamp. Additionally, there is demographic information (e.g., age, gender, occupation, et cetera) associated with users, and descriptors (e.g., movie title, release date, genres, et cetera) associated with movies. Of these features, the user features employed in the evaluations were: age, gender, and occupation; and the only movie feature employed was the genre. The ages were partitioned into 7 groups: under 18, 18 to 24, 25 to 34, 34 to 44, 45 to 49, 50 to 55, and over 56. The age information was encoded by 7-dimensional binary vector with a single entry being equal to 1 to indicate which group the user belongs to. The gender, user occupation and movie genre were also represented by binary vectors. In sum, there were three relations: (1) movie rating prediction for the relation (user, movie, time); (2) the (user, profile) relation; and (3) the (movie, genre) relation. For the first relation, the user date 2001/01/01 was utilized to split the data into training data and test data. There were 904,796 ratings as training data and the remaining 95,413 ratings were the test data. For the second and third relation, one out of every ten entries was randomly selected for testing and the remaining data were used for training. The objective of these empirical evaluations was to predict ratings, and also to predict unobserved user features and unobserved movie genres.

For the Flickr® dataset, the Flickr® data was crawled with the social-network connectors (i.e., Flickr API). This data set included 2,866 users, 60,339 tags, 32,752 comment terms and 46,733 items (e.g., images). Five relations presented in Flickr® data were considered: (1) user-user interaction C1, (2) user-tag C2, (3) tag-item C3, (4) user-tagged item C4, and (5) item-item feature C5. Note that C2, C3, and C4 form into circular relations (i.e., similar to the example of FIGS. 4-5). The response of C1, C2, C3, C4 are binary values where the observed pair are positive samples (r=1). For each positive sample, fifty negative samples (r=0) were generated. In relation C5, for each item (image), the item feature (i.e. image feature) was a 1024-dimension Fisher vector f, where the values of the elements of the Fisher vector are real numbers. For each relation, one out of every ten entries was randomly selected for testing and the remaining data were used for training. The performance is reported herein in terms of rooted mean square error (RMSE) together with negative log-likelihood. The results are presented in Tables 1-3 and in FIGS. 6-10.

TABLE 1

RMSE for MovieLens 1 M splitted dynamically with 90% for training

| view | MF | SGD | PFBS |
|---|---|---|---|
| user-item ratings | 0.9020 | 0.8926 | 0.8962 |
| user-feature | 0.2781 | 0.3206 | 0.2916 |
| item-feature | 0.2955 | 0.3218 | 0.2825 |

In Table 1, we compared the optimization algorithms disclosed herein (employing SGD and PFBS) with standard matrix co-factorization of separate views with linked parameters. The comparison was on three views for the MovieLens 1M rating data set. Results indicates similar predictive performances for the two algorithms, with improvement on the user-item view (corresponding to the error in predicting the ratings). The error in predicting user features seems to be higher in the user-feature prediction. This was mainly due to the fact that the loss was dominated by the user-item ratings view, as it contains much more observations.

Figure 6:
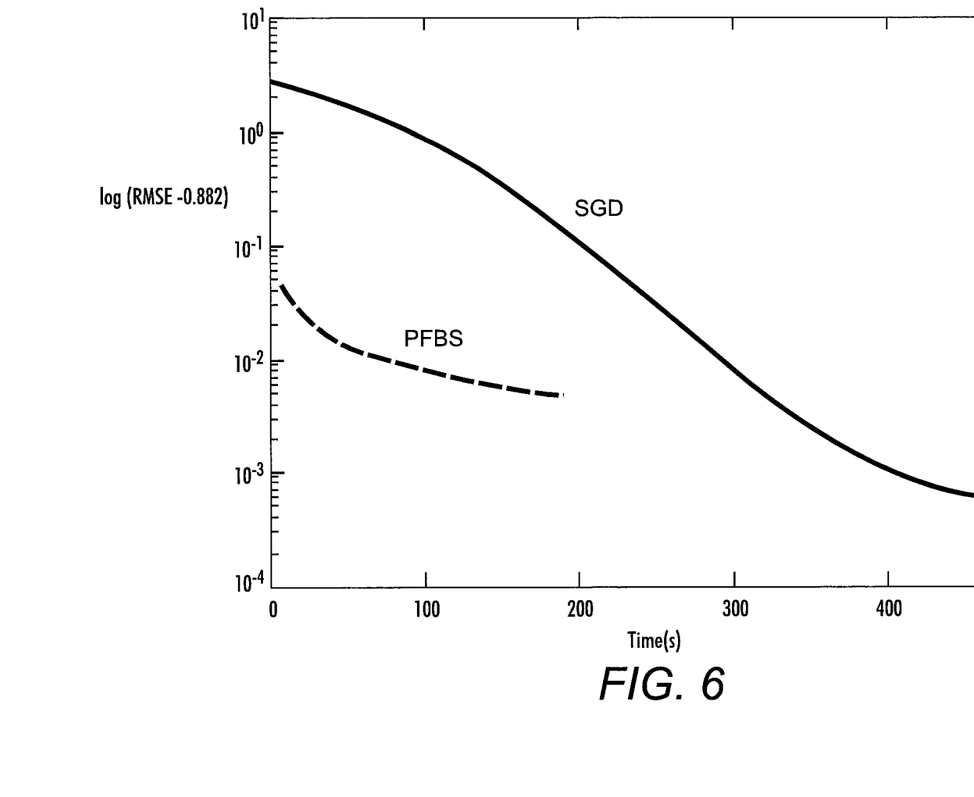
FIGS. 6-10 present various experimental results.

With reference to FIG. 6, results are shown for singular value shrinkage versus stochastic gradient descent (SGD), for RMSE on MovieLens 1M rating data set splitted temporally with 90% data for training with SGD and PFBS. FIG. 6 plots convergence of RMSE vs. iterations for SGD and PFBS. Results in FIG. 6 indicate that the PBFS algorithm outperforms SGD by orders of magnitudes. It is expected that this difference could be mitigated for larger databases that could not be stored in main memory.

Figure 7:
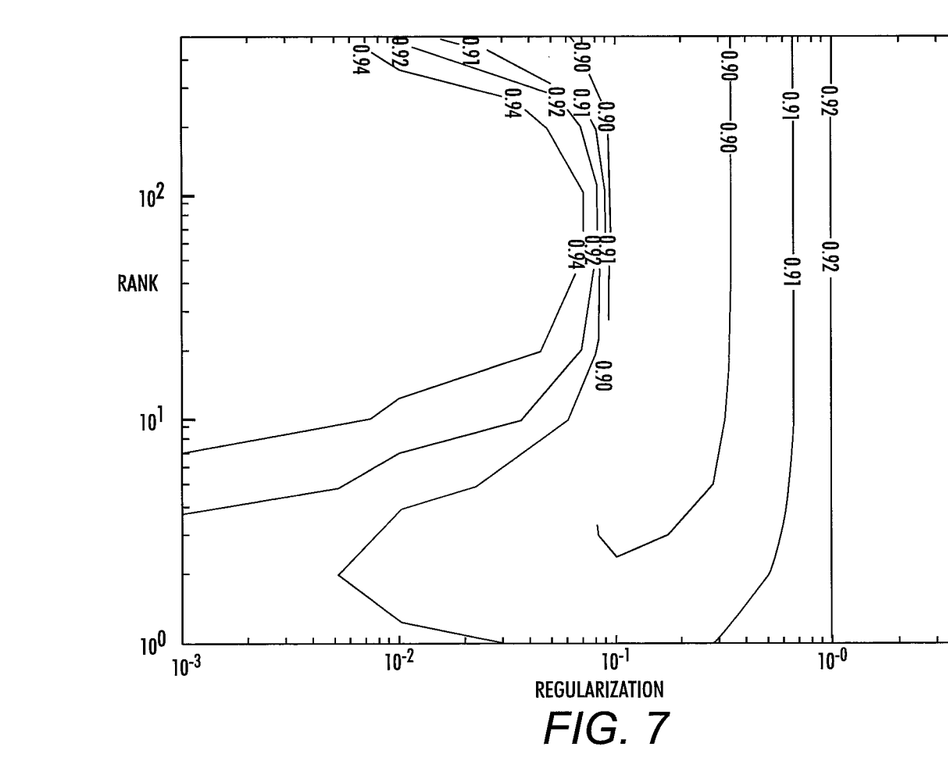

With reference to FIG. 7, regularized low rank approximations with large rank are shown. FIG. 7 plots RMSE for different rank r and regularization parameter λ. On the MovieLens 1M data, the test RMSE of the SGD algorithm were computed for various values of the rank and the regularization. As discussed earlier, the trace norm regularized solutions should appear at the limit of high ranks. The parameter r and λ are tuned, and the RMSE with regularized low rank approximation are shown in FIG. 7. It is seen that best performances are obtained for a regularization λ=0.1, and the test performances are not degrading when r increases, showing that the solution has reached a constant rank. This confirms the fact that for this dataset, there is no need for exact low-rank constraints to obtain the suitable performances. Similar results are also obtained on the Flickr® data experiments presented in Table 3, demonstrating that for a large rank r=200, the best performances are obtained for a regularization λ=0.1 for most of the views, and the testing performances do not degrade for a larger value of λ.

TABLE 3

Test RMSE for the five relations versus λ for Flickr ® data with r = 200 for the weighted collective factorization trace norm

| view | no reg | 0.0001 | 0.001 | 0.1 | 10 |
|---|---|---|---|---|---|
| C1 | 8.3895 | 8.3619 | 5.069 | 0.7138 | 0.7071 |
| C2 | 8.1373 | 8.1081 | 4.6362 | 0.229 | 0.2473 |
| C3 | 13.7447 | 13.7402 | 12.8806 | 0.4758 | 0.3661 |
| C4 | 9.7138 | 9.6808 | 5.1036 | 0.2246 | 0.2384 |
| C5 | 10.6246 | 10.5901 | 5.4967 | 1.0179 | 1.0033 |

Comparisons with independent matrix factorization were also performed. To illustrate the benefit of jointly factorizing multiple relations, the disclosed convex collective matrix factorization is compared with independent probabilistic matrix factorizations (one per relation), using an approach disclosed in Salakhutdinov et al., "Probabilistic matrix factorization", in NIPS 21, pages 1257-1264 (2008). Table 2 shows test RMSE for randomly selected data (static) vs. temporally split data (dynamic) for the MovieLens data set. The results of Table 2 show that the performance of the disclosed convex collective matrix factorization is consistently better than the probabilistic matrix factorization for the tasks of predicting ratings and item features across all settings (e.g., proportion of data used to training, static vs. dynamic testing). Note that these results take into account the temporal information associated with ratings, leading to a dynamic setting that respects the temporal property when dividing the training/testing data.

TABLE 2

Test RMSE for randomly selected data (Static) versus temporally split data (Dynamic) for MovieLens dataset

| % train | Model | Static | Dyna. |
|---|---|---|---|
| 90% | CCMF | 0.9287 | 1.0588 |
|  | PMF | 0.9347 | 1.2159 |
| 80% | CCMF | 0.9501 | 2.2722 |
|  | PMF | 0.9540 | 3.2984 |
| 50% | CCMF | 1.0320 | 3.0931 |
|  | PMF | 1.0415 | 4.2614 |

One approach for improving performance is to weight the trace norm in the objective function. Let $\omega = \{\omega^1, \ldots, \omega^K\} = \{\omega_i^k\}_{i,k}$ be a set of weights, where $\omega_i^k$ is the weight for the i-th entity of entity type k. The weighted collective trace norm then suitably corresponds to a reweighting of each view according to:

$$\|X\|_{*,\omega} = \|\{\text{diag}(\sqrt{\omega^{r_v}})X_v \text{diag}(\sqrt{\omega^{c_v}})\}_{v=1}^V\|_* \quad (10)$$

The weighted trace norm applied to the unconstrained minimization problem (Equation (9)) leads to the following objective function:

$$O'_\lambda = \sum_{v=1}^{|V|} \left( \sum_{(i,j) \in D_v} \left(Y_{ij}^v - (U_i^{r_v})^T U_j^{c_v}\right)^2 + \frac{\lambda}{2}\left(\omega_i^{r_v}\|U_i^{r_v}\|_F^2 + \omega_j^{c_v}\|U_j^{c_v}\|_F^2\right)\right) \quad (11)$$

where the weights are suitably defined as:

$$\omega_i^k = \frac{(p_i^k)^\alpha}{n_i^k} \quad (12)$$

where α, −1≤α≤1 is a parameter and $p_i^k$ are the marginals, i.e. the probability that the i-th entity of entity type k appears in the data. The optimization of $O'_\lambda$ has a global minimum provided that the dimension r of the factor for approximate $U_j$ satisfies r>min{$n^{r_i}, n^{c_i}$} where $n^{r_i}$ and $n^{c_i}$ are the number of rows and columns in $U_j$.

Figure 8:
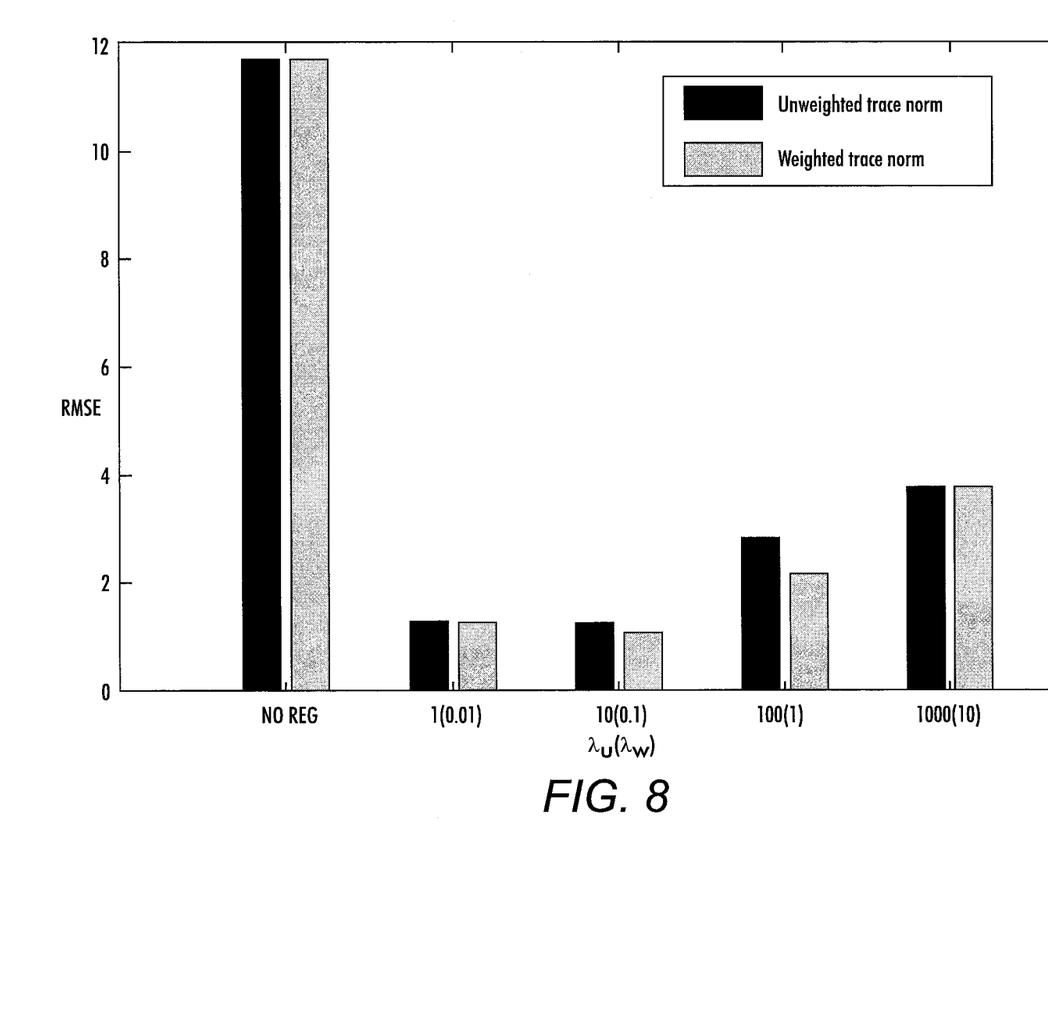

FIG. 8 shows unweighted trace norm versus weighted trace norm for the MovieLens data. When the collective trace norm is employed as regularization, the results reported herein (the right-most four columns in FIG. 8) indicate that the weighted version of the collective factorization trace norm give better performances that the unweighted collective trace norm.

Figure 9:
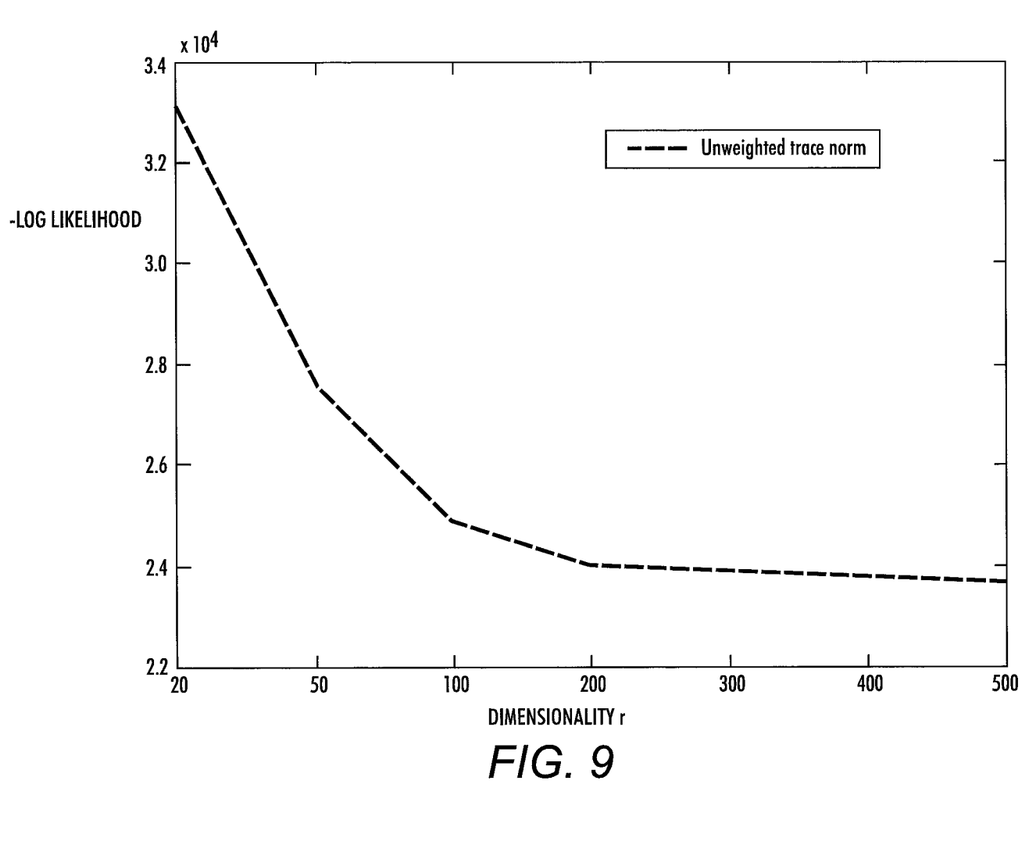

With reference to FIG. 9, convergence of the convex collective matrix factorization is also investigated. As already noted, a global minimum can be obtain by gradually increasing the rank of the solution and continuing the gradient descent until a rank-deficient local minimum is obtained. In FIG. 9, the objective function of the MovieLens data is plotted against the latent dimension r. It is seen that the objective function reaches a nearly constant rate after r=200. The slight decrease of the function for r≥200 is due to the fact that the SGD algorithm did not completely converge.

Figure 10:
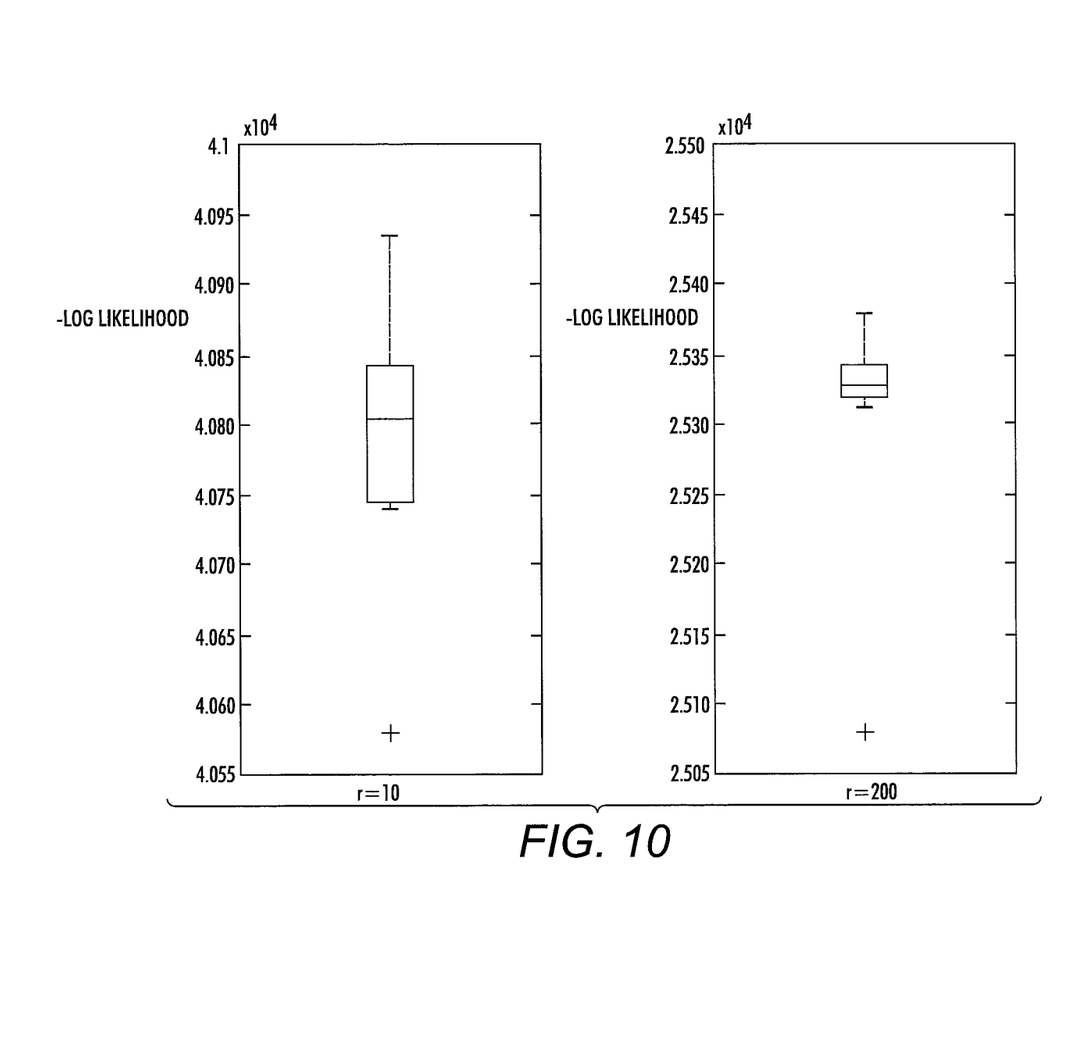

With reference to FIG. 10, it is shown that the disclosed collective trace norm is not sensitive with respect to the random initialization of the latent matrices corresponding to the entity types. The variables $U_1, \ldots, U_K$ were randomly initialized for r=10 and r=200, and the statistics of ten repeated experiments are plotted in FIG. 10. It is observed that with sufficiently large latent dimension r=200, the objective function enjoys a small variance, whereas small r causes results in large variance, illustrating the fact that the predictive performances of regularized collective matrix factorization become less sensitive to the initialization when r increases.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions executable by an electronic data processing device to perform a method including:
   constructing an observed collective symmetric matrix Y storing observed relationship data between pairs of entities for E entities of K different entity types where K is greater than or equal to two with $n_k$ entities belonging to entity type k for k=1, . . . , K and E=$n_1$+ . . . +$n_K$, the observed collective symmetric matrix Y being a symmetric matrix with E rows for the E entities and E columns for the E entities,
   optimizing a prediction collective symmetric matrix X that is also a symmetric matrix with E rows for the E entities and E columns for the E entities in order to minimize a loss function comparing the observed collective symmetric matrix Y with the prediction collective symmetric matrix X, the optimizing generating an optimized prediction collective symmetric matrix $X_{opt}$, and
   performing a prediction operation for a first entity of the E entities given a second entity of the E entities based on an element of the optimized prediction collective symmetric matrix $X_{opt}$ corresponding to the first and second entities.

2. The non-transitory storage medium of claim 1 wherein the constructing comprises:
   constructing the observed collective symmetric matrix Y with, for each entity type k=1, . . . , K, the $n_k$ rows grouped as contiguous rows and the $n_k$ columns grouped as contiguous columns.

3. The non-transitory storage medium of claim 1 wherein the optimizing comprises:
   optimizing the prediction collective symmetric matrix X in order to minimize a convex loss function comparing the observed collective symmetric matrix Y with the prediction collective symmetric matrix X.

4. The non-transitory storage medium of claim 3 wherein the optimizing comprises:
   optimizing the prediction collective symmetric matrix X in order to minimize a convex loss function $l(X,Y)+\lambda\|X\|_*$ where $l(X,Y)$ is a function comparing the prediction collective symmetric matrix X and the observed collective symmetric matrix Y, $\|X\|_*$ is the trace norm of the prediction collective symmetric matrix X, and $\lambda$ is a scalar value.

5. The non-transitory storage medium of claim 4 wherein the trace norm of the prediction collective symmetric matrix X is computed using a semi-definite program (SDP).

6. The non-transitory storage medium of claim 4 wherein $l(X,Y)=\|P_\Omega(X)-P_\Omega(Y)\|_F^2$ where the set $\Omega$ is the observed relationship data between pairs of entities, $P_\Omega:X\rightarrow X$ is a projection onto the set of matrixes equal to zeros outside the observed values defined by the set $\Omega$, and $\|\ldots\|_F^2$ is the Frobenius norm.

7. The non-transitory storage medium of claim 3 wherein the optimizing is performed using singular value thresholding.

8. The non-transitory storage medium of claim 7 wherein the singular value thresholding is performed using singular value decomposition (SVD).

9. The non-transitory storage medium of claim 7 wherein the singular value thresholding is performed using proximal forward-backward splitting (PFBS) that alternates between a singular value decomposition (SVD) operation and an operation imputing missing values.

10. The non-transitory storage medium of claim 1 wherein the performed method is an item recommendation method, the K different entity types include at least a user type and an item type, and the performing includes:
    performing a prediction operation comprising predicting a rating for an item by a user based on an element of the optimized prediction collective symmetric matrix $X_{opt}$ corresponding to the item and user.

11. The non-transitory storage medium of claim 10 wherein the K different entity types further include at least one of (i) user features characterizing users and (ii) item features characterizing items.

12. The non-transitory storage medium of claim 1 wherein K is greater than or equal to three.

13. An apparatus comprising:
    a non-transitory storage medium as set forth in claim 1; and
    an electronic data processing device configured to read and execute instructions stored on the non-transitory storage medium.

14. A method operative on observed relationship data between pairs of entities of a set of entities, the set of entities including entities of at least two different entity types, the method comprising:
    constructing an observed collective symmetric matrix in which element (n,m) equals element (m,n) and stores the observed relationship between entities of the set of entities indexed n and m conditional upon the observed relationship data including an observed relationship between the entities indexed n and m;
    optimizing a prediction collective symmetric matrix in order to minimize a loss function comparing the observed collective symmetric matrix and the prediction collective symmetric matrix, the optimizing generating an optimized prediction collective symmetric matrix; and
    predicting a relationship between two entities of the set of entities using the optimized prediction collective symmetric matrix;
    wherein the constructing, the optimizing, and the predicting are performed by an electronic data processing device.

15. The method of claim 14 wherein the constructing comprises indexing entities of the same entity type using a contiguous set of indices such that the entity type maps to a contiguous set of rows and corresponding contiguous set of columns in the observed collective symmetric matrix.

16. The method of claim 14 wherein the loss function is convex.

17. The method of claim 16 wherein the convex loss function includes a regularization term comprising a trace norm of the prediction collective symmetric matrix.

18. The method of claim 17 wherein the optimizing includes computing the trace norm of the prediction collective symmetric matrix using a semi-definite program (SDP).

19. The method of claim 14 wherein the set of entities include entities of at least a user entity type and an item entity type, and the predicting comprises:
receiving a user for which an item recommendation is to be provided; and
predicting a rating for an item by the user for which an item recommendation is to be provided using the optimized prediction collective symmetric matrix.

20. The method of claim 19 wherein the set of entities further include entities of at least one of (i) a user feature type and (ii) an item feature type, and the observed relationship data between pairs of entities of the set of entities include ratings of items by users and at least one of (I) associations of user features with users and (II) associations of item features with items.

21. The method of claim 14 wherein the set of entities include entities of at least three different entity types.

22. An apparatus operative on observed relationship data between pairs of entities of a set of entities, the set of entities including entities of at least two different entity types, the apparatus comprising:
an electronic data processing device programmed to perform operations including:
constructing an observed collective symmetric matrix Y in which element (n,m) equals element (m,n) and stores the observed relationship between entities of the set of entities indexed n and m conditional upon the observed relationship data including an observed relationship between the entities indexed n and m; and
optimizing a prediction collective symmetric matrix X in order to minimize a convex loss function $l(X,Y) + \lambda \|X\|_*$ where $l(X,Y)$ is a function comparing the prediction collective symmetric matrix X and the observed collective symmetric matrix Y, $\lambda \|X\|_*$ is the trace norm of the prediction collective symmetric matrix X, and $\lambda$ is a scalar value.

23. The apparatus of claim 22 wherein the electronic data processing device is further programmed to perform the operation of predicting a relationship between two entities of the set of entities using an optimized prediction collective symmetric matrix generated by the optimizing.

24. The apparatus of claim 22 wherein the constructing comprises constructing the observed collective symmetric matrix Y with all rows storing observed relationships involving entities of the same type grouped together as a contiguous set of rows and all columns storing observed relationships involving entities of the same type grouped together as a contiguous set of columns.

25. The apparatus of claim 22 wherein the trace norm of the prediction collective symmetric matrix X is computed using a semi-definite program (SDP).

26. The apparatus of claim 22 wherein the set of entities includes entities of at least three different entity types.

* * * * *